United States Patent
Hallam et al.

(10) Patent No.: US 7,598,187 B2
(45) Date of Patent: Oct. 6, 2009

(54) REINFORCING MAT HAVING THERMALLY FUSED STITCHING

(75) Inventors: Colin J. Hallam, Phenix City, AL (US); Derrell M. Winowich, Phenix City, AL (US); Louis Kevin Horne, Opelika, AL (US)

(73) Assignee: The Garland Company, Inc., Cleveland, OH (US)

( * ) Notice: Subject to any disclaimer, the term of this patent is extended or adjusted under 35 U.S.C. 154(b) by 847 days.

(21) Appl. No.: 11/112,783

(22) Filed: Apr. 22, 2005

(65) Prior Publication Data

US 2005/0197025 A1 Sep. 8, 2005

Related U.S. Application Data

(63) Continuation of application No. 10/240,155, filed on Sep. 27, 2002, now abandoned, which is a continuation of application No. PCT/US01/21508, filed on Jul. 9, 2001, now abandoned.

(60) Provisional application No. 60/216,607, filed on Jul. 7, 2000.

(51) Int. Cl.
*D04H 3/05* (2006.01)
*D04H 1/00* (2006.01)

(52) U.S. Cl. ........................ 442/367; 442/361; 442/364; 428/296.7

(58) Field of Classification Search ................. 442/361, 442/364, 366–369, 373
See application file for complete search history.

(56) References Cited

U.S. PATENT DOCUMENTS

| 4,528,223 | A | 7/1985 | Kumazawa et al. |
| 4,867,925 | A | 9/1989 | Feijen et al. |
| 5,203,186 | A | 4/1993 | Zafiroghu |
| 5,445,693 | A | 8/1995 | Vane |
| 5,612,114 | A | 3/1997 | Zalewski et al. |
| 5,753,338 | A | 5/1998 | Jelic et al. |
| 5,795,835 | A | 8/1998 | Bruner et al. |
| 5,809,805 | A | 9/1998 | Palmer et al. |
| 5,902,757 | A | 5/1999 | Stern et al. |
| 2004/0121685 | A1 | 6/2004 | Hallam et al. |

FOREIGN PATENT DOCUMENTS

| FR | 2594858 | 8/1987 |
| WO | WO 02/04725 A1 | 1/2002 |

*Primary Examiner*—Lynda Salvatore
(74) *Attorney, Agent, or Firm*—Fay Sharpe LLP; Brian E. Turung

(57) ABSTRACT

A mat useful for reinforcing composite materials is made up of at least first and second sets of fibers, the first set of fibers laid as a ply in spaced apart parallel relationship in the direction of construction and the second set laid as a ply in spaced apart parallel relationship perpendicular to the direction of construction. These fibers define interstices, into which a continuous filament is knitted to provide stability. The filament has a core portion and a sheath portion, the sheath portion having a lower melting point than the core portion. The sheath portion is thermally fusible to form a plurality of closed loops in which the respective sets of fibers are entrapped. The fibers are glass or glass rovings and the filament is a polyester, the core portion being a high-viscosity poly(ethylene terephthalate) and the sheath portion being a low-viscosity poly(ethylene terephthalate).

18 Claims, 1 Drawing Sheet

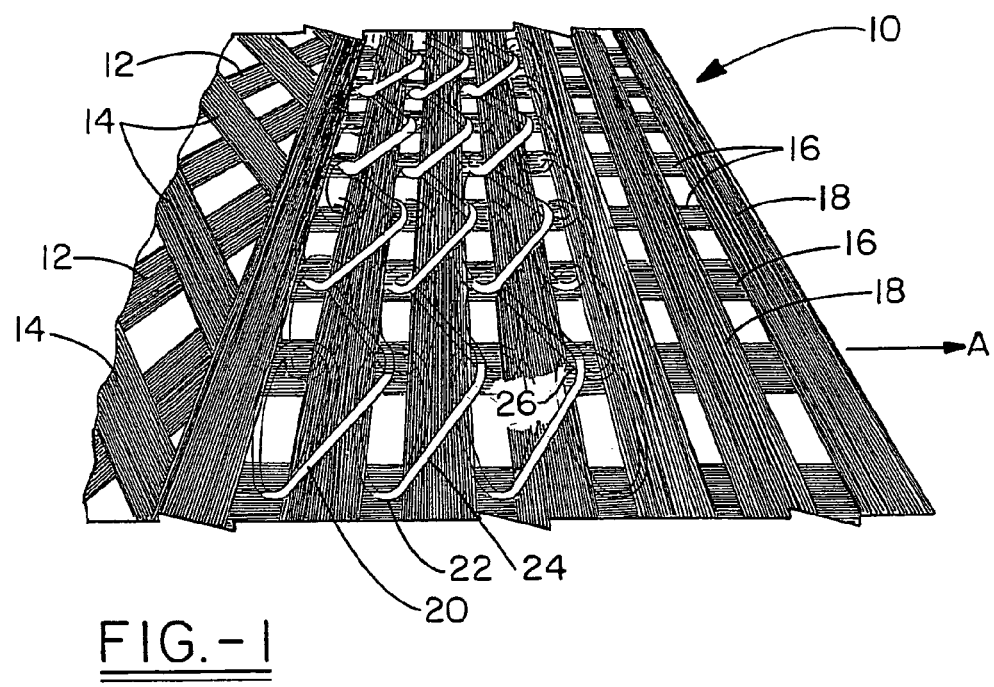
FIG.-1
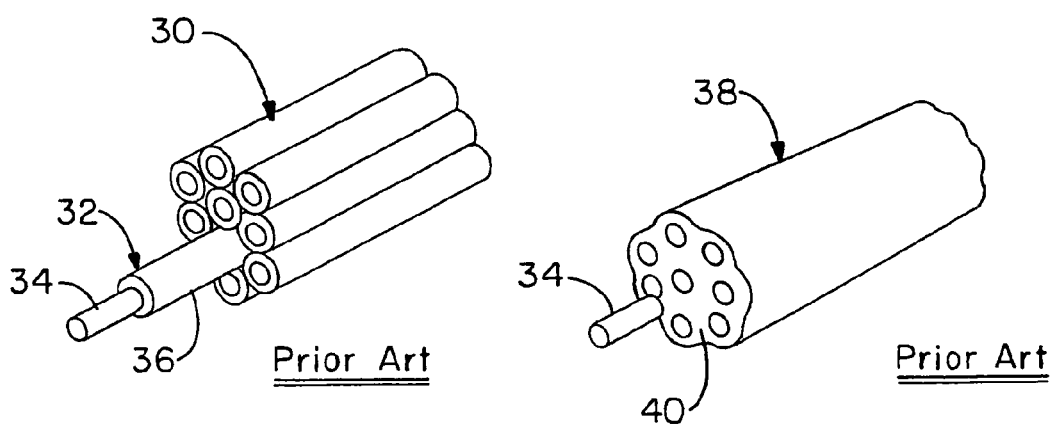
FIG.-2 Prior Art
FIG.-3 Prior Art

REINFORCING MAT HAVING THERMALLY FUSED STITCHING

The patent application is a continuation of U.S. application Ser. No. 10/240,155 filed Sept. 27, 2002, now abandoned which in turn is a continuation of International Application Serial No. PCT/US01/21508 filed Jul. 9, 2001, now abandoned, which in turn claims priority on U.S. Provisional Application Ser. No. 60/216,607 filed Jul. 7, 2000, now abandoned.

The present invention relates to a reinforcing mat, comprising either woven or non-woven fibers, wherein the fibers are held into a predetermined position relative to each other by a stitched or knitted yarn or thread. In the invention, the yarn or thread comprises at least one filament having a core portion and a sheath portion, the sheath portion surrounding the core portion along the length of the filament and being characterized by a melting point which is lower than the melting point of the core portion.

BACKGROUND OF THE ART

It is well known in many industries to manufacture reinforcing mats for use in adding strength to composite materials. Such mats are, in fact, generally referred to as composite reinforcements. These mats are then impregnated with a liquid material, such as a resin, a bitumen or the like to form a composite material.

Since it is common to prepare the composite reinforcement mats at a place and time remote from the place and time of impregnating it, it is necessary to maintain the fibers of the mats in a predetermined configuration from the point of manufacture until the point of impregnation, at which the fibers are effectively permanently oriented. In fact, it is in some cases necessary to bring more than one mat together at the point of impregnation, orient them relative to each other, and then impregnate them, locking in the relative orientation of the respective mats.

In general, the fibers used to comprise the mats have high melting points or have structural orientations internal to the fibers which could be compromised if the fibers were heated to a high enough temperature to effect any thermal bonding or fusion between the fibers. Likewise, certain adhesives which could be used to secure the fibers in the desired orientation in the mat are undesirable, because their presence adversely affects the ability of the impregnating resin or liquid to fully wet and saturate the mat at the time of impregnation. Even further, the very impregnation process works best when the reinforcing fibers are held together in only proximate relationship, but are not affixed to each other, as this allows the best penetration of the impregnating liquid.

To avoid these problems, the general prior art solution has been to fabricate a mat of the reinforcing fibers by either weaving the fibers together or orienting them into the desired relationship, and then securing them in this configuration, at least temporarily, by stitching or knitting the mat together using a filament. Just as adhesives for securing the fibers must be compatible with the ultimate impregnating agent, the filament used should also be compatible, that is, it should be fully capable of being wetted and saturated by the impregnating agent. For this reason, some filaments which could be thermally fused after stitching or knitting are simply incompatible with the impregnating agent. An example of this would be the incompatibility of a fusible polypropylene filament with a polyester impregnant.

Stitching or knitting inherently provides relatively large loops or other closed circuits of the filament with only a small percentage of the filament sufficiently proximate to other portions of the filament to allow fusion or bonding of the filament portions. When reinforcing mats are stitched or knitted together in the manner known in the prior art, any activity which causes breaks in the filament or pulls the filament out of place can result in catastrophic disruption of the filament matrix which the stitching or knitting has created. For example, cutting the mat, snagging the filament and the like, especially snagging the filament while painting the impregnating liquid into the mat, can all result in "unzipping" the filament, destroying the predetermined fiber orientation.

It is therefore, an unmet need of the industry to provide a reinforcing mat wherein the fibers are held securely in a predetermined orientation relative to each other prior to impregnation by a compatible filament which has been thermally fused to itself at junctures in the filament after the knitting or stitching process.

SUMMARY OF THE INVENTION

This advantage of the present invention is provided by a mat for reinforcing having a direction of construction. Such a mat has a first set of fibers laid as a ply in spaced apart parallel relationship in the direction of construction, and a second set of fibers laid as a ply in spaced apart parallel relationship perpendicular to the direction of construction. The position of the second set of fibers relative to the first set of fibers defines a plurality of interstices. A continuous filament is knitted into the interstices to provide stability to the mat, and the filament selected has a core portion and a sheath portion, the sheath portion having a melting point that is lower than a melting point of the core portion, such that sheath portion is thermally fusible to form a plurality of closed loops in which the first and second sets of fibers are entrapped.

In some embodiments, a third set of fibers is provided, laid as a ply between the first and the second sets. This third set of fibers is laid in spaced apart parallel relationship oblique to the direction of construction and oblique to the direction of the second set of fibers. Accordingly, the position of the third set of fibers relative to the first and second sets of fibers defines interstices.

In yet further embodiments, the mat comprises a fourth set of fibers, laid as a ply between said first and said second sets with the third set. This fourth set of fibers is laid in spaced apart parallel relationship oblique to the first, second and third sets, the position of the fourth set of fibers relative to the first, second and third sets of fibers further defining interstices.

In the embodiments, respective sets of fibers are glass fibers or glass rovings.

In the invention, the filament comprises a high-viscosity polyester core portion and a low-viscosity polyester sheath portion., especially a poly(ethylene terephthalate) polyester. The filament can be a mono-filament construction or a multi-filament construction.

When the third set of fibers is used, it may be laid at an angle of 45E relative to each of the first and second sets of fibers.

When the fourth set of fibers is used, it may be laid at an angle of 45E relative to each of the first and second sets of fibers and perpendicular to the third set of fibers.

BRIEF DESCRIPTION OF THE DRAWINGS

Better understanding of the present invention will be had when reference is made to the accompanying drawings, wherein identical reference numerals refer to identical parts and wherein:

FIG. 1 shows a schematic partial perspective of a reinforcing mat incorporating the present invention;

FIG. 2 shows an enlarged section of a multi-filament yarn useful in the present invention, prior to fusing of the sheath portions thereof; and FIG. 3 shows an enlarged section of the multi-filament yarn of FIG. 2 after fusing of the sheath portions.

DETAILED DESCRIPTION OF THE INVENTION

A reinforcing mat 10 incorporating the present invention may be fabricated in variety of manners. As one aspect of the invention is illustrated in FIG. 1, the mat 10 comprises a plurality of fibers. Particularly, FIG. 1 shows four sets or plies of fibers. The third set of these fibers are indicated by reference number 12. A reinforcing mat 10 is typically constructed in a specific direction, shown in FIG. 1 as an arrow A. The fibers in first fiber set 12 are laid substantially parallel to each other and aligned at an angle of about 45E to the direction of construction A. A fourth layer or set of fibers, this one designated as 14, lie atop the third set. The fibers in fourth set 14 are also substantially parallel to each other, but they are aligned so that their respective axes are approximately perpendicular to the axes of the third set 12. A first set of fibers 16 is laid down with the respective axes substantially parallel to the direction of manufacture A. And a second set of fibers 18 is laid atop the first set, the second set of fibers having their respective axes substantially perpendicular to the direction of manufacture A. The fibers in the respective sets 12, 14, 16 and 18 are typically lineal and will generally retain this lineality due to the inherent rigidity of the material from which they are manufactured. A commonly used fiber, for example, would be a glass fiber or a glass roving. Since the fibers in the sets 12, 14, 16 and 18 are not woven together with any of the adjacent sets and since the fibers in any given set are only laid out in approximately parallel equal spacings, the individual fibers in any given set would have no particular stability without more. Further, while the sets of fibers are shown as being laid down in the particular order shown, there is no particular benefit to the order and the fibers could be laid down in a different order relative to the other fibers and still achieve the desired result of the invention. Further, the invention requires at least two layers or sets of fibers, but the advantage of the invention may be achieved using only two layers and may also be achieved using more than the four layers specifically shown and described.

In the aspect illustrated in FIG. 1, a filament 20 is shown as being sewn or knitted into a plurality of interstices 22 between the respective fibers 12, 14, 16, 18. It will, of course, be understood that while four sets of fibers 12, 14, 16 and 18 are illustrated in FIG. 1, the advantages of the present invention may be achieved through the use of a filament having a fusible sheath to lock together the stitching or knitting of the filament around at least two sets of fibers which are either interwoven or laid in non-parallel fashion, and that the invention is similarly not limited to applications involving four or fewer such sets of fibers. In similar fashion, the exact method of knitting or stitching the filament into and among the interstices provided by the fiber sets is not considered critical to the operation of the invention, and either a weft knit or warp knit, including tricot or chain, technique should prove to be equally applicable, provided that the technique provides intersection points of adjacent portions of the filament which may be fused together to define closed loops.

In the knitted condition shown in FIG. 1, the filament 20 generally comprises a plurality of linear portions 24 of the individual filament and a plurality of proximate portions 26, where one portion of the filament is proximate to another portion. The present invention distinguishes the prior art at these latter portions 26. In the prior art, the proximate portions 26 of the filament are not physically joined, whether by knotting, thermal fusing or any other means. As a result, if a break occurs anywhere in the filament 20, the proximate portions 26 cannot hold the mat 10 together and the filament can be pulled free from the mat, with a loss of structure in the individual layers.

In the present invention, the mat is heated after the filament 20 has been sewed or knitted into place around the fiber sets 12, 14, 16, 18 through the interstices 22. The heating is to a temperature which is not sufficient to melt either the filament 20 or the fiber sets 12, 14, 16 and 18, but is sufficient (as explained in more detail below) to melt an outer sheath on the filament 20. Clearly, the temperature required to melt the sheath portion of the filament should be significantly less than the temperature required to cause any loss of structural properties in the fiber sets, much less to melt the fiber sets. This melting of the outer sheath portion of the filament 20 results in two possible effects. First, adjacent portions of the filament in the proximate portions 26 will fuse together, effectively forming a series of closed loops with which the fiber sets 12, 14, 16 and 18 are entrapped. Second, the same heat which fuses the proximate portions 26 is also sufficient to fuse some of the linear portions 24 to the particular fibers along which they lie. While this effect is shown and described with reference to a case where the sets of fibers are laid atop each other in a non-woven embodiment, the result would be identical if the fibers would be woven together, although the need for the present invention is not nearly so great as in the situation where the fiber sets are not woven.

A filament of the type useful in the present invention is manufactured by Kanebo Company of Japan, and commercially sold under the trademark BELLCOUPLE. The BELLCOUPLE filament, as understood from Kanebo literature, comprises at least one core portion of a high-viscosity polyester polymer and a sheath portion around the core portion comprising a lower melting point polymer, typically of a lower viscosity polyester. It is believed the Kanebo BELLCOUPLE polyester is a poly(ethylene terephthalate) ("PET"), with the cores being a high viscosity PET and the sheath being a co-polymer containing PET. The filament of the present invention construction may be presented as a monofilament construction or as a multi-filament construction. FIGS. 2 and 3, taken from Kanebo marketing literature, show the filament in one aspect as a multi-filament embodiment 30 in which a plurality of monofilaments 32 are massed together, each monofilament 32 comprising a core portion 34 and a sheath portion 36. In the same manner that FIG. 3 shows the respective sheath portions 36 from FIG. 2 as fusing together to form a single fused filament 38 in which a plurality of non-fused core portions 34 are embedded in a fused sheath mass 40, adjacent filaments when knitted together can fuse to form closed loops to entrap fibers in a spaced relationship as shown in FIG. 1. This is different from the use of the Kanebo BELLCOUPLE filament described in their literature, where woven filaments are fused together A particular advantage that may be achieved with a fusible filament made of polyester is that many impregnating resins used with reinforcing mats of fiber sets as described above will be polyester resins. For that reason, the filament used to fuse the stitching in the reinforcing mats will be compatible with the resin which forms the continuous impregnating matrix surrounding and encompassing the reinforcing mat.

What is claimed is:

1. A mat for reinforcing composite materials comprising a plurality of first and second sets of fibers, each of said first and second set of fibers include a plurality of fibers, glass ravings or combinations thereof, said plurality of said first set of fibers laid as a ply in spaced apart parallel relationship in a direction of construction, said plurality of said second set of fibers laid as a ply in spaced apart parallel relationship in a direction non-parallel to said direction of construction wherein said plurality of said second set of fibers has a position relative to said plurality of said first set of fibers to form a plurality of interstices, and a filament at least partially knitted into a plurality of said interstices to provide stability to said plurality of said first and second set of fibers, said filament encircling a plurality of said fibers in one of said first sets of fibers and a plurality of fibers in one of said second set of fibers at said interstices of said first and second set of fibers so as to at least partially secure said plurality of fibers together at said interstices, said filament including an outer surface having a lower melting point than said plurality of said first and second set of fibers, said filament thermally fused together at overlapping regions of said filament at said interstices to form a plurality of closed loops about a plurality of fibers in each of said first and second set of fibers, said plurality of fibers of said first and second set of fibers being in a non-melted state relative to one another, at least a portion of said fibers are not bonded with said filament.

2. The reinforcing mat as defined in claim 1, including a third set of fibers laid as a ply between said first and said second sets of fibers, each of said third set of fibers includes a plurality of fibers, glass rovings or combinations thereof, said third set of fibers laid in spaced apart parallel relationship and non-parallel to said direction of construction, a plurality of fibers of said third set of fibers at least partially entrapped within a plurality of said closed loops.

3. The reinforcing mat as defined in claim 1, wherein the filament is a mono-filament construction.

4. The reinforcing mat as defined in claim 2, wherein the filament is a mono-filament construction.

5. The reinforcing mat as defined in claim 1, wherein said filament includes a core portion and a sheath portion, said sheath portion having a melting point that is lower than a melting point of said core portion.

6. The reinforcing mat as defined in claim 2, wherein said filament includes a core portion and a sheath portion, said sheath portion having a melting point that is lower than a melting point of said core portion.

7. The reinforcing mat as defined in claim 4, wherein said filament includes a core portion and a sheath portion, said sheath portion having a melting point that is lower than a melting point of said core portion.

8. The reinforcing mat as defined in claim 5, wherein said filament includes a high-viscosity polyester core portion and a low-viscosity polyester sheath portion.

9. The reinforcing mat as defined in claim 6, wherein said filament includes a high-viscosity polyester core portion and a low-viscosity polyester sheath portion.

10. The reinforcing mat as defined in claim 7, wherein said filament includes a high-viscosity polyester core portion and a low-viscosity polyester sheath portion.

11. The reinforcing mat as defined in claim 3, including a fourth set of fibers laid substantially perpendicular to said third set of fibers, each of said fourth set of fibers include a plurality of fibers , glass rovings or combinations thereof, a plurality of said fibers of said fourth set of fibers at least partially entrapped within a plurality of said closed loops.

12. The reinforcing mat as defined in claim 2, including a fourth set of fibers laid substantially perpendicular to said third set of fibers, each of said fourth set of fibers include a plurality of fibers, glass rovings or combinations thereof, a plurality of said fibers of said fourth set of fibers at least partially entrapped within a plurality of said closed loops.

13. The reinforcing mat as defined in claim 10, including a fourth set of fibers laid substantially perpendicular to said third set of fibers, each of said fourth set of fibers include a plurality of fibers, glass rovings or combinations thereof, a plurality of said fibers of said fourth set of fibers at least partially entrapped within a plurality of said closed loops.

14. The reinforcing mat as defined in claim 9, including a fourth set of fibers laid substantially perpendicular to said third set of fibers, each of said fourth set of fibers include a plurality of fibers, glass rovings or combinations thereof, a plurality of said fibers of said fourth set of fibers at least partially entrapped within a plurality of said closed loops.

15. The reinforcing mat as defined in claim 9, wherein at least a portion of said fibers of said third set of fibers are not bonded with said filament.

16. The reinforcing mat as defined in claim 13, wherein at least a portion of said fibers of said third set of fibers are not bonded with said filament.

17. The reinforcing mat as defined in claim 14, wherein at least a portion of said fibers of said fourth set of fibers are not bonded with said filament.

18. The reinforcing mat as defined in claim 16, wherein at least a portion of said fibers of said fourth set of fibers are not bonded with said filament.

* * * * *